July 19, 1960
J. C. HOUSTON
2,945,258
APPARATUS FOR PRODUCING PLASTIC MATERIAL
Filed April 22, 1958
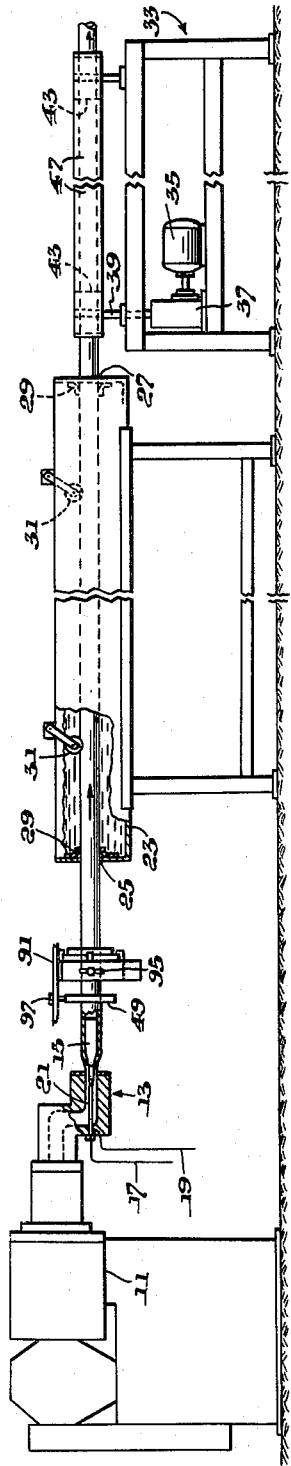
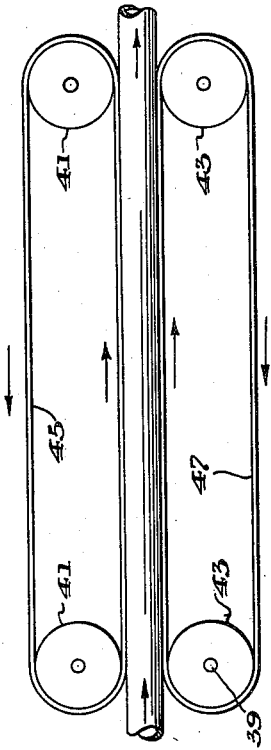
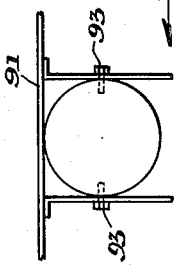
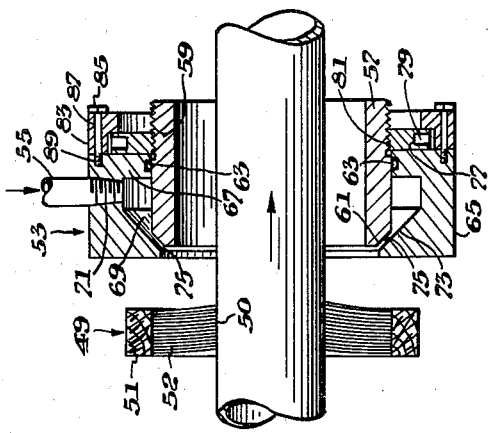
INVENTOR.
JOHN C. HOUSTON.
BY Oscar B. Brumback.
his
ATTORNEY.

United States Patent Office 2,945,258
Patented July 19, 1960

2,945,258

APPARATUS FOR PRODUCING PLASTIC MATERIAL

John C. Houston, Beaver Falls, Pa., assignor to Koppers Company, Inc., a corporation of Delaware Filed Apr. 22, 1958, Ser. No. 730,153

8 Claims. (Cl. 18—14)

This invention relates to an apparatus and process for producing plastic material and more particularly to an apparatus and process for producing extruded plastic material with a smooth, shiny surface thereon.

Plastic materials such as cellulose acetate, polystyrene, methyl methacrylate, ethyl cellulose, vinylidene chloride, nylon and polyethylene are commonly extruded through dies of various shapes. To produuce pipe, it is common practice to force the preheated plastic material through a forming die and over a mandrel. Since the material leaving the die is hot, soft and easily deformed, a problem arises in cooling the pipe to cause it to harden before it becomes distorted.

A conventional way of solving this problem has been to pass the pipe through a multiple jet water spray to cool the pipe sufficiently to prevent distortion. It has been difficult to produce pipe having the desirable characteristic of a smooth, shiny surface with this conventional practice because the surface of the pipe is not easily wetted and the sprays known heretofore tend to build up transitory water fronts in the form of little waves along the outside surface of the moving pipe thereby causing the formation of undesirable waves in the outer surface of the pipe. To overcome this difficulty, the pipe is passed through external sizing rings after it passes through the multiple jet water spray and before it hardens completely, but this procedure has had the undesirable effect of causing variations in the inside dimensions of the pipe.

An object of this invention, therefore, is to provide a novel apparatus and process for producing thermoplastic pipe which has uniform inner and outer diameters and uniformly smooth, shiny, outer surface.

This invention contemplates an apparatus and process for producing pipe of thermoplastic material having a smooth, shiny outer surface and uniform inside and outside diameters by passing the plastic material through an extrusion die and over a forming mandrel, so as to form a semi-self-sustaining pipe and thereafter passing said pipe through a resiliently formed aperture which cooperates with a solid stream of fluid in the shape of a hollow cone so as to smooth and partially cool the outer surface of said pipe.

The above and further objects and novel features of the invention will appear more fully from the following detailed description when the same is read in connection with the accompanying drawings. It is to be expressly understood, however, that the drawings, are not intended as a definition of the invention but are for the purpose of illustration only.

Fig. 1 is a partial elevation of the novel apparatus of this invention for producing thermoplastic pipe.

Fig. 2 is a plan view of the pipe transporter shown in Fig. 1.

Fig. 3 is a partial cross-section of the novel brushing means and cooling means of Fig. 1.

Fig. 4 is a cross-section of the support for the novel brushing means and cooling means shown in Fig. 1.

Referring to Fig. 1, thermoplastic material such as cellulose acetate, polystyrene, methyl methacrylate, ethyl cellulose, vinylidene chloride, nylon and polyethylene are heated and, by means of a worm (not shown), extruded from an extruder 11 through a die 13 in a conventional manner. This die 13 may have associated therewith a hollow substantially tubular mandrel 15 with a blunt nose for forming the material into pipe. Water is advantageously circulated in the mandrel by means of suitable pipes 17 and 19 to cool the inside of the pipe. The mandrel is held by a rod 21 fixed at one end near the infeed end of the die 13. This arrangement forms the heated material into soft, semi-self-sustaining pipe with uniform inside and outside diameters. The pipe is conventionally cooled on the outside by a plurality of water sprays so as to partially harden the pipe before passing the pipe through a water bath to further cool the pipe so as to harden the pipe further for coiling and cutting.

A tank 23 which is open at the top and filled with water provides such a water bath. The pipe enters tank 23 through a hole 25 and leaves through a hole 27. Conventional rubber or synthetic annular rubber gaskets 29 are attached to the tank 23 around these holes 25 and 27 and these gaskets seal the sides of the tank with the outside of the pipe as it passes through the annulus in the gaskets 29. Suitable hold-down rollers 31 having tapered wheels which fit the curvature of the pipe are mounted on brackets attached to the tank 23 and prevent the pipe from rising to the surface of the water in the tank and guide the pipe evenly through the tank.

The pipe is conventionally transported through the tank 23 and pulled from the extruder 11 by means of a take-off machine 33 having positive means for lightly contacting the sides of the pipe. As disclosed, take-off machine 33 includes an electric motor 35, which through a gear box 37 having a power transmission shaft 39, drives four wheels 41 and 43 and two rubber belts 45 and 47 (Fig. 2). These wheels and belts are in spaced relationship to grip the pipe. Thus, motor 35 travels the belts 45 and 47 to transport the pipe to a suitable location for coiling and cutting.

The foregoing has described a conventional apparatus for producing thermoplastic pipe. As was pointed out above, the pipe on leaving the die 13 is semi-self-supporting. To cool the outer surface of this pipe it has been conventional to pass the pipe through jet sprays. This as the disadvantage of carrying waves along the outer surface of the pipe. When smooth pipe was desired, the pipe was passed through sizing rings. This had the undesirable tendency of causing variations in the inside and outside diameters of the pipe.

In accordance with this invention, pipe is produced having uniform inside and outside diameters and a smooth, shiny outer surface by passing plastic material through an extrusion die and over a forming mandrel so as to form a semi-self-sustaining pipe and thereafter passing the pipe through a resiliently formed aperture which cooperates with a solid stream of fluid in the shape of a hollow cone so as to smooth and partially cool the outer surface of the pipe.

Advantageously the resiliently formed aperture comprises a brush 49 of substantial thickness having a resilient aperture 50 therein corresponding to the shape of the pipe being smoothed. This brush 49, formed as a circular retainer 51 holding resilient bristles 52 which are tapered from one end to the other, surrounds the pipe. The narrow ends, i.e., the free ends of the bristles 52 are disposed around the pipe and uniformly contact the outer surface of the pipe to form the resilient aperture 50. Thus the outside of the pipe is smoothed by brushing and the resilience of the bristles prevents distortion of the inside and outside diameters of the pipe.

Disposed immediately adjacent the outfeed side of the brush 49 is a nozzle 53 connected by conduit 55 (Fig. 3) with a suitable source of cooling media (not shown). This nozzle includes a sleeve 57 which has a bore larger than the outside diameter of the extruded pipe. One end of sleeve 57 is threaded with threads 59 and the other end is tapered to a shoulder 61. Intermediate the ends of sleeve 57 is a conventional ring 63 to seal sleeve 57 with an outer sleeve 65 which is supported around sleeve 57 by a shoulder 67. Fluid is supplied to the opening between sleeves 65 and 57 by way of portion 69 which communicates with conduit 55 threaded into hole 71 in sleeve 65. Adjacent cut-out portion 69 the sleeve 65 has a shoulder 73 tapered to cooperate with shoulder 61 of sleeve 57 to form an annular extending orifice 75 through which a stream of fluid is directed at the juncture of the brush 49 and the pipe. The width of the orifice 75 can be adjusted to be larger or smaller by moving sleeve 57 axially with respect to sleeve 65 and thus control the width of the stream of water directed at brush 49.

This adjustment of orifice 75 may be accomplished by means of a spanner nut 77 which has on its outside an annular array of spanner holes 79 and on its inside threads 81 which mesh with threads 59 of sleeve 57. One side of nut 77 abuts sleeve 57. The other side of nut 77 abuts four clamps 83 which are L shaped in cross-section and are attached to sleeve 65 by means of bolts 85. Conveniently, bolts 85 are inserted in holes 87 in the clamps and threaded into an annular array of holes 89 in sleeve 65 after nut 77 is threaded on sleeve 57. Thus rotation of a conventional spanner wrench (not shown) in the spanner holes 79 turns nut 77 and relatively moves sleeves 57 and 65 axially so as to increase or decrease the width of orifice 75.

Advantageously, nozzle 53 is positioned adjacent the brush 49 on the outfeed side of the brush 49 and the arrangement of its parts as described creates a solid stream of water in the form of a hollow frusto-conical shape. The narrow part of this hollow cone is directed at the juncture where the pipe contacts the brush in a direction opposite to the direction of movement of the pipe relative to the brush. How this form of water spray operates with the brush to cool the outside of the pipe uniformly into a smooth, shiny surface is not completely understood; but based on tests, it is theorized that this shape of spray together with the brush uniformly distributes the water around the outside of the pipe and thus prevents excess water from accumulating on the bottom of the pipe due to gravity. Furthermore, by directing the water in the manner described there are no transient water fronts formed along the outside of the pipe to cause waves in the outer surface of the pipe as was the case with cooling means used heretofore.

Advantageously the nozzle 53 is held by a frame 91 which is U shaped in cross-section and attached to the sides of sleeve 65 by bolts 93 inserted in slot 95 in frame 91. Brush 49 is also held by frame 91 by means of a bolt 97 inserted through the top of the frame 91. After passing through the nozzle 53 the pipe is smooth on its outer surface and the pipe on its outer surface is hard enough to prevent changes in the inside and outside diameters of the pipe caused by further handling of the pipe.

Further handling of the pipe is conventional and may include, for example, exposing the pipe to a water bath for hardening the entire wall thickness of the pipe and then coiling and cutting the pipe.

In operation, using polyethylene as the thermoplastic material, the material is heated to about 350° F. to 375° F. and forced by suitable means such as a worm gear (not shown) from a conventional extruder through the die 13 and over the mandrel 15 so as to produce a soft, semi-self-sustaining pipe having uniform outside and inside diameters and the inside diameter of the pipe corresponds to the outside diameter of the mandrel 15 respectively. The pipe in this soft, semi-self-sustaining condition is firm enough to maintain its shape without collapse. The brush 49 then smooths the outside of the pipe and the nozzle 53 evenly sprays a fluid stream of water in the shape of a hollow cone against the bristles of the brush 49 and the outside of the extruded pipe to maintain a uniform temperature around the brush and to cool and uniformly harden the outside portion of the pipe sufficiently for further handling. Also this water stream helps the bristles of the brush 49 to produce the desired smooth surface on the outside of the pipe without changing the inside and outside diameters of the pipe. Thereafter the pipe may be passed through a water bath such as is provided in the tank 23 where the whole cross-section of the pipe is completely hardened into a fully sustaining pipe and carried by the take-off machine 33 to a suitable location for coiling and cutting. It will be noted that the extrusion temperature will vary with the material being extruded. The cooling water may be at ambient temperature and the rate of flow of water from nozzle 53 will depend on the cooling desired.

This invention provides an apparatus for producing a smooth, shiny surface on continuous substantially uniform thermoplastic material and also provides a method of producing a smooth, shiny outside surface on such material.

What is claimed is:

1. Apparatus for smoothing the outside of heated semi-self-sustaining thermoplastic pipe of predetermined inside and outside diameters so as to produce a smooth, shiny surface on its outside without substantially changing its dimensions comprising a brush having an annular array of bristles fixed at one end in a ring and free at the other end to form an aperture for evenly contacting the outside of said pipe and spray means for forming a solid stream of water in the shape of a hollow cone whose sides converge with said aperture whereby said brush evenly distributes said water around the outside of said pipe thereby to cool the outside surface of said pipe and to produce a smooth, shiny surface on its outside without substantially changing the dimensions thereof.

2. Apparatus for water cooling heated extruded non-self-sustaining thermoplastic pipe of predetermined inside and outside diameters and producing a smooth, shiny surface on its outside without substantially changing its dimensions comprising water cooled first means for cooling the inside of said non-self-sustaining pipe so as to make said non-self-sustaining pipe semi-self-sustaining, an annular brush adjacent said first means providing a resiliently formed aperture for evenly contacting the outside of said pipe, spray means for forming a solid stream of water in the shape of a hollow cone whose sides converge with said aperture so as to cool said brush and to evenly wet said pipe thereby simultaneously to cool the outside surface of said pipe and to produce a smooth shiny surface thereon, and additional means uniformly and evenly moving said pipe through said resilient means.

3. Apparatus for water cooling heated extruded non-self-sustaining thermoplastic pipe of predetermined dimensions and simultaneously producing a smooth, shiny surface on the outside thereof without substantially changing its dimensions comprising water cooled first means for cooling the inside of said non-self-sustaining pipe so as to make said non-self-sustaining pipe semi-self-sustaining, an annular brush adjacent said first means providing a resilient aperture, said brush having tapered bristles whose narrow ends contact the outside of said pipe, means for spraying a solid stream of water in the form of a hollow cone at an angle to the longitudinal axis of said pipe substantially in the direction of the outfeed side of said brush, said stream of water for uniformly cooling said brush and for partially cooling said pipe, and means forcing said pipe through said brush.

4. Apparatus for evenly water cooling the outside of heated extruded non-self-sustaining thermoplastic pipe having predetermined dimensions and simultaneously producing a smooth, shiny surface on its outside without substantially changing its dimensions comprising water cooled first means for cooling the inside of said non-self-sustaining pipe so as to make said non-self-sustaining pipe semi-self-sustaining, an annular brush adjacent said first means providing a resiliently formed aperture, a nozzle having an adjustable orifice for uniformly directing a solid sheet of water in the shape of a hollow cone at an angle to the longitudinal axis of said pipe substantially in the direction of the outfeed side of said brush and for varying the amount of water directed by said nozzle, and means forcing said pipe uniformly and evenly through said brush.

5. Apparatus for water cooling heated continuously extruded non-self-sustaining thermoplastic pipe having predetermined dimensions and simultaneously producing a smooth, shiny surface on its outside without substantially changing its dimensions comprising water cooled first means for cooling the inside of said non-self-sustaining pipe so as to make said non-self-sustaining pipe semi-self-sustaining, an annular brush adjacent said first means providing a resiliently formed aperture for evenly contacting the outside of said semi-self-sustaining pipe, a nozzle for forming a solid stream of fluid in the shape of a hollow cone whose sides converge with said aperture so as to cool said brush and thereby to cool the outside surface of said semi-self sustaining pipe, means for further cooling said semi-self-sustaining pipe having a water bath with means for preventing said pipe from rising to the surface of said water bath, and means uniformly and evenly moving said pipe through said brush said nozzle and said water bath.

6. Apparatus for smoothing extruded heated non-self-sustaining thermoplastic pipe having predetermined dimensions and simultaneously producing a smooth, shiny surface on its outside without substantially changing its dimensions, comprising water cooled first means for cooling the inside of said non-self-sustaining pipe so as to make said non-self-sustaining pipe semi-self-sustaining, an annular brush adjacent said first means providing a resiliently formed aperture for evenly contacting the outside of said semi-self-sustaining pipe, said brush including tapered bristles and a circular retainer for holding said bristles so that the narrow portions of said bristles form said resilient aperture, and a nozzle for forming a solid stream of fluid in the shape of a hollow cone whose sides converge with said aperture so as to cool said brush and to evenly wet said semi-self-sustaining pipe thereby to cool the outer surface of said semi-self-sustaining pipe and to produce a smooth, shiny surface on the outside of said semi-self-sustaining pipe, said nozzle including a first sleeve surrounding said semi-self-sustaining pipe and a second sleeve, said sleeves having cooperating shoulders to provide an orifice directed at an angle to the longitudinal axis of said semi-self-sustaining pipe, and means providing fluid under pressure through said orifice to provide said solid stream of fluid.

7. Apparatus for producing thermoplastic pipe having uniform inside and outside diameters and a smooth outside surface comprising, first means for extruding non-self-sustaining thermoplastic pipe having uniform inside and outside diameters, second means adjacent the outfeed end of said first means for cooling the inside of said pipe to make said pipe semi-self-sustaining, a brush located adjacent the outfeed side of said second means so as to receive said semi-self-sustaining pipe and having an annular array of bristles fixed at one end in a ring and free at the other end so as to form a compliant aperture whose inside diameter is slightly less than the outside diameter of said semi-self-sustaining pipe whereby the bristles of said brush are adapted to contact evenly said semi-self-sustaining pipe and are deflected slightly when said semi-self-sustaining pipe is passed through said brush, a nozzle adapted to receive and freely pass said semi-self-sustaining pipe after passing through said brush and having means for directing a solid sheet of cooling water in the shape of a hollow cone against said semi-self-sustaining pipe substantially in the direction of said brush whereby the bristles of said brush in contact with said pipe are wetted with cooling water thereby simultaneously to smooth the outside of said semi-self-sustaining pipe without changing the inside and outside diameters thereof and to distribute water evenly around said semi-self-sustaining pipe so as to cool said semi-self-sustaining pipe into self-sustaining pipe, and means for continuously removing said self-sustaining pipe on the outfeed side of said nozzle including means for further cooling said self-sustaining pipe for handling.

8. Apparatus for producing thermoplastic pipe having uniform inside and outside diameters and a smooth, shiny outside surface comprising an extruder having an annular die and means for forcing non-self-sustaining thermoplastic material through said die, a hollow tubular mandrel with a blunt nose adjacent the outfeed side of said die and held by a rod fixed adjacent the infeed side of said die so that said non-self-sustaining material is forced through said die and over said mandrel to form non-self-sustaining thermoplastic pipe having uniform inside and outside diameters, means for circulating water in said mandrel so as to cool the inside of said non-self-sustaining pipe whereby said non-self-sustaining pipe is partially cooled into semi-self-sustaining pipe of uniform inside and outside diameters, a brush located adjacent the outfeed end of said mandrel so as to receive said semi-self-sustaining pipe and having an annular array of bristles fixed at one end in a ring and free at the other end so as to form a compliant aperture whose inside diameter is slightly less than the outside diameter of said semi-self-sustaining pipe whereby the bristles of said brush are adapted to contact evenly said semi-self-sustaining pipe and are deflected slightly when said semi-self-sustaining pipe is passed through said brush, a nozzle adapted to receive and freely pass said semi-self-sustaining pipe after passing through said brush and having means for directing a solid sheet of cooling water in the shape of a hollow cone against said semi-self-sustaining pipe substantially in the direction of said brush whereby the bristles of said brush in contact with said pipe are wetted with cooling water thereby simultaneously to smooth the outside of said semi-self-sustaining pipe without changing the inside and outside diameters thereof and to distribute water evenly around said semi-self-sustaining pipe so as to cool said semi-self-sustaining pipe into self-sustaining pipe, and means for continuously removing said self-sustaining pipe on the outfeed side of said nozzle including means for further cooling said self-sustaining pipe for handling.

References Cited in the file of this patent

UNITED STATES PATENTS

| | | |
|---|---|---|
| 2,168,993 | Joseph | Aug. 8, 1939 |
| 2,634,164 | Drake | Apr. 7, 1953 |
| 2,641,022 | Kress | June 9, 1953 |
| 2,661,499 | James et al. | Dec. 8, 1953 |
| 2,832,642 | Lennox | Apr. 29, 1958 |
| 2,890,862 | Heller | June 16, 1959 |

FOREIGN PATENTS

| | | |
|---|---|---|
| 740,458 | Great Britain | Nov. 16, 1955 |